Nov. 6, 1928.
A. J. VALLEE
1,690,387
BLOCK SIGNAL SYSTEM FOR RAILROADS
Filed Oct. 22, 1927
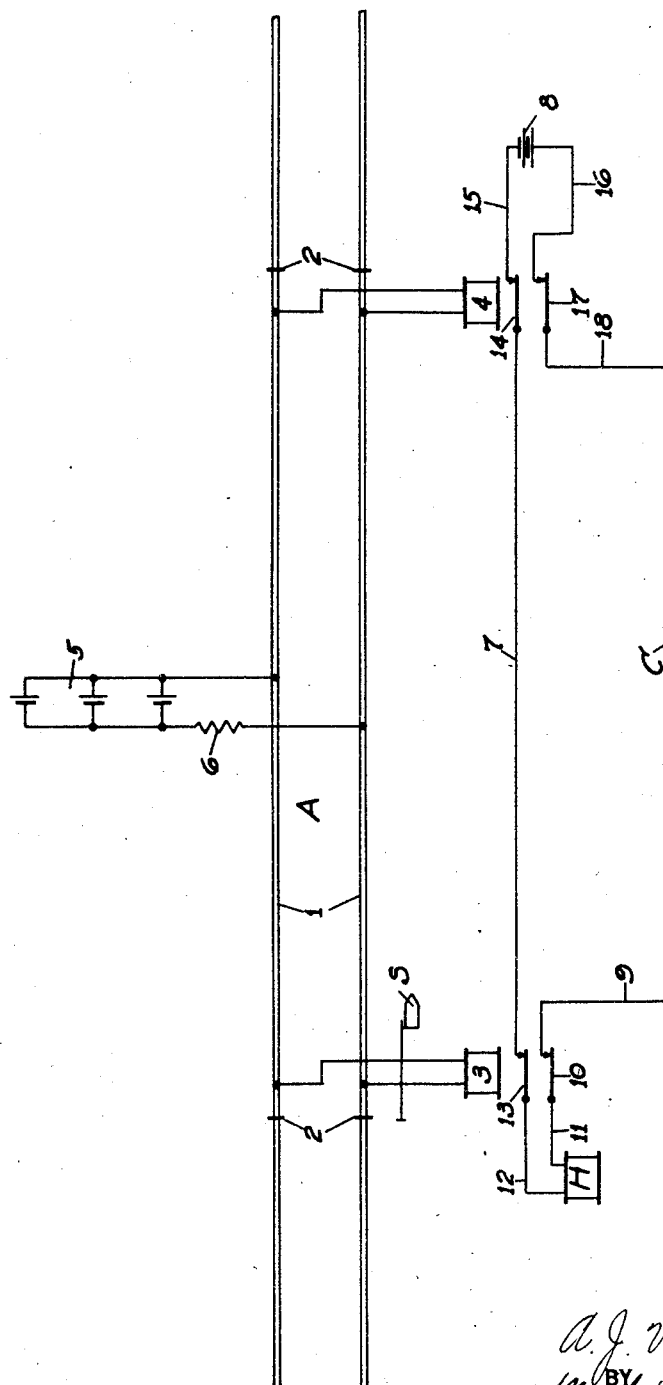

Patented Nov. 6, 1928.

1,690,387

UNITED STATES PATENT OFFICE.

ARMAND J. VALLEÉ, OF ALBANY, NEW YORK, ASSIGNOR TO GENERAL RAILWAY SIGNAL COMPANY, OF ROCHESTER, NEW YORK.

BLOCK SIGNAL SYSTEM FOR RAILROADS.

Application filed October 22, 1927. Serial No. 228,022.

This invention relates to automatic block signal systems for railroads and more particularly to an improved form of line circuit. The principal object of this invention is to provide an improved arrangement of wires and track relay contacts forming an economical line control circuit having a high degree of protection against dangerous effects of crosses and grounds.

The accompanying drawing shows in a simplified and diagrammatic way one specific embodiment of the invention.

Referring to the accompanying drawing, the invention contemplates that the railroad track will be divided by insulated joints in the usual way into track circuits, one or more of which constitute a block. As shown, track rails 1 are divided by insulated joints 2 into blocks, one complete block A being shown. This block A is illustrated as having a typical well-known center-fed track circuit, with track relays 3 and 4 at the ends of the block, and a track battery 5 and the usual limiting resistance connected across the track rails near the middle of block. At the entrance to the block A is a signal S, which is illustrated conventionally as the usual semaphore signal but which may be a color or position light signal, or any other suitable type.

In such an arrangement illustrated, the signal S should be controlled by both of the track relays 3, 4, so as to give the stop indication when a train is passing in any portion of the block A. In accordance with established practice this is accomplished by providing a line relay H, energized by a line circuit controlled by both track relays.

Obviously it is very important that the line circuit for the line relay H shall be so organized that said relay cannot be improperly energized by a combination of crosses or grounds likely to occur. While this desired end may be obtained to a high degree by having a complete metallic circuit for the relay H, the number of line wires required, particularly for multi-track roads, makes such expedient expensive.

According to the present invention the line circuit for the relay H includes a common wire C for the system and a line wire 7; but instead of connecting the relay H and its energizing battery 8 direct to this common wire, the front contact of the corresponding track relay is interposed in such connection, the complete energizing circuit for the relay H then being as follows:—

Starting at common wire C, wire 9, contact 10 of track relay 3, wire 11, relay H, wire 12, contact 13 of track relay 3, line wire 7, front contact 14, of track relay 4, wire 15, battery 8 or other source of current, wire 16, front contact 17 of track relay 4, and wire 18, back to the common wire C.

It will be observed that by virtue of this particular arangement of relay contacts and wires, I have obtained inexpensive and economical line circuit which, however, is inherently protected against the effects of ordinary crosses or grounds.

The particular embodiment of the invention shown in the drawings is merely typical and illustrative; and I desire to have it understood that my invention may be applied to various other forms and types of block signal systems.

What I claim is:—

1. In a block signal system, a combination of a block having two track relays; a common wire for the system; a line relay; and a line circuit for said line relay including a line wire and said common wire, two front contacts of each track relay, and a source of energy.

2. In an automatic block signal system, in combination with a block having two track relays at opposite ends, a line relay at one end of the block, a source of current at the other end of the block, a common wire for the system, and a line circuit for said line relay including said common wire, and a front contact of the corresponding track relay interposed in said circuit between the common wire and said line relay and source of current respectively.

In testimony whereof I affix my signature.

ARMAND J. VALLEÉ.